United States Patent [19]

Ohnishi et al.

[11] Patent Number: 5,400,158
[45] Date of Patent: Mar. 21, 1995

[54] LIQUID CRYSTAL DISPLAY WITH OPTICALLY ANISOTROPIC MEMBER HAVING A TWISTED STRUCTURE AND PHASE PLATE

[75] Inventors: Hiroshi Ohnishi, Nara; Keiko Kishimoto, Osaka, both of Japan

[73] Assignee: Sharp Kabushiki Kaisha, Osaka, Japan

[21] Appl. No.: 97,263

[22] Filed: Jul. 23, 1993

[30] Foreign Application Priority Data

Jul. 24, 1992 [JP] Japan ................................. 4-198187
Feb. 12, 1993 [JP] Japan ................................. 5-024496

[51] Int. Cl.6 ..................... G02F 1/1335; G02F 1/133
[52] U.S. Cl. ..................................... 359/73; 359/53
[58] Field of Search ................................ 359/73, 53

[56] References Cited

U.S. PATENT DOCUMENTS

| 4,813,770 | 3/1989 | Clerc et al. | 359/73 |
| 5,126,866 | 6/1992 | Yoshimizu et al. | 359/73 |
| 5,166,817 | 11/1992 | Ota et al. | 359/73 |

FOREIGN PATENT DOCUMENTS

| 0350075 | 1/1990 | European Pat. Off. . |  |
| 0465107 | 1/1992 | European Pat. Off. . |  |
| 0479551 | 4/1992 | European Pat. Off. . |  |
| 63-149624 | 6/1988 | Japan . |  |
| 63-271433 | 11/1988 | Japan . |  |
| 64-519 | 1/1989 | Japan . |  |
| 1-219720 | 9/1989 | Japan . |  |
| 4-109217 | 4/1992 | Japan | 359/73 |
| 4-131824 | 5/1992 | Japan | 359/73 |

Primary Examiner—Anita Pellman Gross
Attorney, Agent, or Firm—David G. Conlin; Robert F. O'Connell; Kevin J. Fournier

[57] ABSTRACT

A liquid crystal display is disclosed. The liquid crystal display includes: a liquid crystal panel including a pair of substrates and super twisted nematic liquid crystal having a twisted structure with a twist angle of 180° or more, the super twisted nematic liquid crystal being contained between the pair of substrates; a pair of polarizing plates which sandwich the liquid crystal panel; an optically anisotropic plate having a twisted structure with a twist angle of 90° or less, the optically anisotropic plate being disposed between one of the pair of polarizing plates and the liquid crystal panel, or between the other one of the pair of polarizing plates and the liquid crystal panel; and a phase plate of a polymeric film which is uniaxially extended, the phase plate being disposed between one of the pair of polarizing plates and the liquid crystal panel, or between the other one of the pair of polarizing plates and the liquid crystal panel.

20 Claims, 10 Drawing Sheets

RETARDATION OF OPTICALLY ANISOTROPIC
SUBSTANCE HAVING 90°-TWISTED STRUCTURE (um)

— 450nm
--- 550nm
-·- 650nm

LIQUID CRYSTAL DISPLAY WITH OPTICALLY ANISOTROPIC MEMBER HAVING A TWISTED STRUCTURE AND PHASE PLATE

BACKGROUND OF THE INVENTION

1. Field of the Invention

The present invention relates to a super twisted nematic mode liquid crystal display (hereinafter, abbreviated as an "STN-LCD") with color compensation which is used for, for example, a monochrome display or a multicolor display in a word processor, or a personal computer.

2. Description of the Related Art

In such an STN-LCD, a display is performed by utilizing the birefringence of super twisted nematic (STN) liquid crystal. Due to the anisotropy of refractive index, the display is colored so as to be yellow, green or blue, which is referred to as a coloring phenomenon. In order to compensate for the coloring phenomenon, the STN-LCD is generally provided with a color compensating plate.

A double-layered STN-LCD (DSTN-LCD) is a representative example in which such a color compensating plate is provided. In the DSTN-LCD, the coloring which occurs in displaying cells constituting a first layer is color-compensated by using optical compensating cells constituting a second layer. The optical compensating cells of the second layer have a twisted structure which is reversed to a twisted structure of the cells of the first layer, whereby an achromatic color display is realized.

Alternatively, there is a proposal to use a phase plate for the same optical compensation as in the case where the above optical compensating liquid crystal cells are used. An exemplary STN-LCD with a phase plate is disclosed in Japanese Laid-Open Patent Publication No. 64-519. In the disclosed STN-LCD, the phase plate is produced by uniaxially extending a polymeric film of polyester, polyvinyl alcohol, or the like, and a display is made to be achromatic by the thus produced phase plate.

FIGS. 17A and 17B show the STN-LCD disclosed in the above-identified patent publication. FIG. 17A shows an STN-LCD of a twentieth example, and FIG. 17B shows an STN-LCD of a twenty-first example of the above-identified patent publication. The STN-LCD shown in FIG. 17A includes a front-side polarizing plate 1, a front-side phase plate 2 of a polymeric film which is uniaxially extended, a pair of light transmission substrates 4 for an STN liquid crystal panel 10, a pair of transparent electrodes 5, a pair of orientation films 6, a nematic liquid crystal layer (an STN liquid crystal layer) 7 to which a chiral dopant is added, and a back-side polarizing plate 8. The STN-LCD shown in FIG. 17B additionally includes a back-side phase plate 9 of a polymeric film which is uniaxially extended. In the STN-LCDs shown in these figures, light is incident on the STN liquid crystal panel 10 from the back-side polarizing plate 8. As described above, in the STN-LCD of the twentieth example, one phase plate of a uniaxial polymer film is provided in front of the STN liquid crystal panel. In the STN-LCD of the twenty-first example, two phase plates are provided in front of and at the back of the STN liquid crystal panel, respectively.

Moreover, a thirty-first example to the thirty-fourth example of the above-identified patent publication describe, in order to perform the optical compensation, a construction in which one liquid crystal polymeric film of a mixture film of polypeptide and polymethylmethacrylate which exhibits a cholesteric phase and has an inversely twisted structure by 210° to 360°, instead of the phase plate is disposed.

However, the conventional DSTN-LCD necessitates two layers of cells for displaying and compensating. Thus, the DSTN-LCD has a problem in that the thickness thereof is larger and also the weight is larger than that of a single-layer STN-LCD.

In addition, the construction as shown in FIG. 17A or 17B in which one phase plate of a uniaxially extended polymeric film is provided in front of the STN liquid crystal panel, or two phase plates of uniaxially extended polymeric films are provided in front of and at the back, of the STN liquid crystal panel has a limitation in an achromatic degree of the display. Thus, there exists a problem in that such a construction is inferior to the DSTN-LCD in the contrast ratio, and the black/white display. This is because the phase difference variation depending on the wavelength in the liquid crystal panel is not completely equal to the phase difference variation depending on the wavelength in the uniaxially extended polymeric film, so that the phase difference cannot be compensated over the entire visible range. Another reason is that the rotatory polarization of the liquid crystal panel cannot be compensated unless a plurality of phase plates are disposed one over the other in such a manner that the optical axes are rotated from each other so as to make a spurious twisted structure.

Moreover, according to the construction in which one liquid crystal polymeric film which exhibits a cholesteric phase and has an inversely twisted structure is disposed in front of the STN liquid crystal panel, instead of the phase plate, a good display to a degree closer to that attained by the DSTN-LCD can be obtained. However, it is difficult to equalize the phase difference variation depending on the wavelength in the STN panel with the phase difference variation depending on the wavelengths in the liquid crystal polymeric film, so that the construction also has a limitation in achromatizing the display. In addition, the construction has various problems in a method for strictly regulating the twist angle by 180° or more, in reliability for environmental resistance, and in high-volume production capability, so that this construction is not practically used.

SUMMARY OF THE INVENTION

The liquid crystal display of this invention includes: a liquid crystal panel including a pair of substrates and super twisted nematic liquid crystal having a twisted structure with a twist angle of 180° or more, the super twisted nematic liquid crystal being contained between the pair of substrates; a pair of polarizing plates which sandwich the liquid crystal panel; a member of an optically anisotropic substance having a twisted structure with a twist angle of 90° or less, the member being disposed between one of the pair of polarizing plates and the liquid crystal panel, or between the other one of the pair of polarizing plates and the liquid crystal panel; and a phase plate of a polymeric film which is uniaxially extended, the phase plate being disposed between one of the pair of polarizing plates and the liquid crystal panel, or between the other one of the pair of polarizing plates and the liquid crystal panel.

In one embodiment, a twist direction of the super twisted nematic liquid crystal is in reverse to a twist direction of the member.

In the above embodiment, a product d·Δn is in the range from 180 nm to 700 nm, where d is a thickness of the member and Δn is the anisotropy of refractive index.

In another embodiment, a twist direction of the super twisted nematic liquid crystal is the same as a twist direction of the member.

In the above embodiment, a product of d·Δn is in the range from 500 nm to 1100 nm, where d is a thickness of the member and Δn is the anisotropy of refractive index.

In another embodiment, the phase plate is a film of polycarbonate.

In another embodiment, the phase plate is a film of polyvinylalcohol.

In another embodiment, the phase plate is a quarter-wave plate of polycarbonate.

In another embodiment, the phase plate is a quarter-wave plate of polyvinylalcohol.

According to another aspect of the invention, a liquid crystal display is provided. The liquid crystal display includes: a liquid crystal panel including a pair of substrates and super twisted nematic liquid crystal having a twisted structure with a twist angle of 180° or more, the super twisted nematic liquid crystal being contained between the pair of substrates; a pair of polarizing plates which sandwich the liquid crystal panel; a member of an optically anisotropic substance having a twisted structure with a twist angle from 60° to 130°, the member being disposed between one of the pair of polarizing plates and the liquid crystal panel; and a phase plate of a polymeric film which is uniaxially extended, the phase plate being disposed between the other one of the pair of polarizing plates and the liquid crystal panel.

In one embodiment, a twist direction of the super twisted nematic liquid crystal is in reverse to a twist direction of the member.

In the above embodiment, a product d·Δn is in the range from 180 nm to 700 nm, where d is a thickness of the member and Δn is the anisotropy of refractive index.

In another embodiment, a twist direction of the super twisted nematic liquid crystal is the same as a twist direction of the member.

In the above embodiment, a product of d·Δn is in the range from 500 nm to 1100 nm, where d is a thickness of the member and Δn is the anisotropy of refractive index.

In another embodiment, the phase plate is a film of polycarbonate.

In another embodiment, the phase plate is a film of polyvinylalcohol.

In another embodiment, the phase plate is a quarter-wave plate of polycarbonate.

In another embodiment, the phase plate is a quarter-wave plate of polyvinylalcohol.

In this invention, a member of an optically anisotropic substance having a twisted structure, and a phase plate of a polymeric film which is uniaxially extended are disposed between one of a pair of polarizing plates and a liquid crystal panel, whereby the rotatory polarization caused by the liquid crystal panel is eliminated, and the phase difference between the liquid crystal panel and the phase plate is compensated. In this case, the disposed order of the phase plate and the optically anisotropic member may not be determined, that is, either one can be on the side of the liquid crystal panel. Moreover, it is not necessary to dispose both the optically anisotropic member and the phase plate on the front side or the back side of the liquid crystal panel. Alternatively, one of them can be disposed on the front side of the liquid crystal panel and the other one can be disposed on the back side thereof.

Moreover, by using the optically anisotropic member having a twisted structure, the retardation value depending on the wavelength can be controlled, so that it is possible to desirably use a phase plate of various kinds of polymeric films.

Thus, the invention described herein makes possible the advantage of providing a thin and light liquid crystal display by which an achromatic color display can be realized with superior reliability and high-volume production capability.

This and other advantages of the present invention will become apparent to those skilled in the art upon reading and understanding the following detailed description with reference to the accompanying figures.

DESCRIPTION OF THE PREFERRED EMBODIMENTS

Hereinafter, the invention will be described by way of examples with reference to figures.

Figure 1:
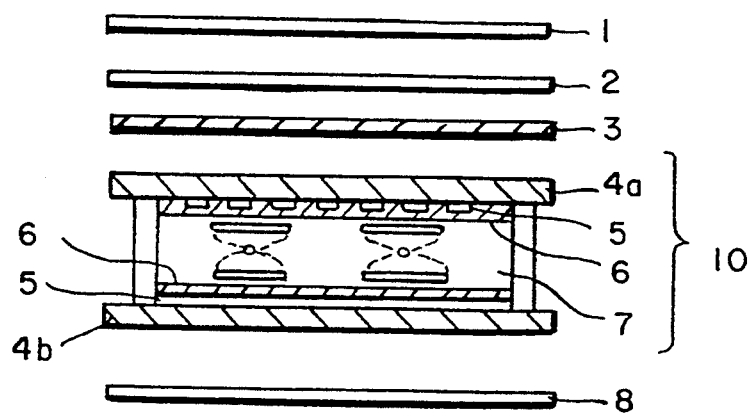
FIG. 1 is a schematic cross-sectional view showing a liquid crystal display according to the invention.
Figure 2:
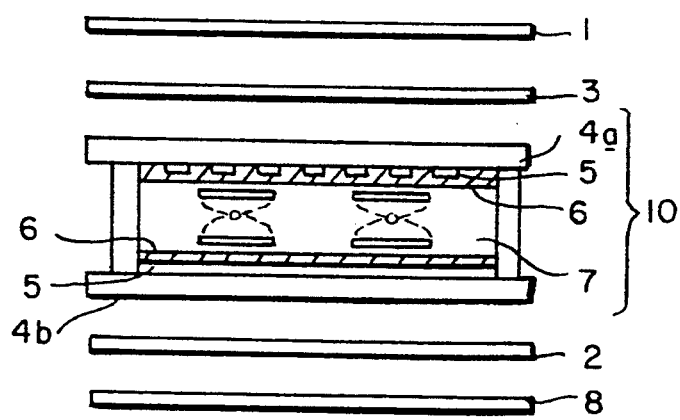
FIG. 2 is a schematic cross-sectional view showing another liquid crystal display according to the invention.
Figure 3:
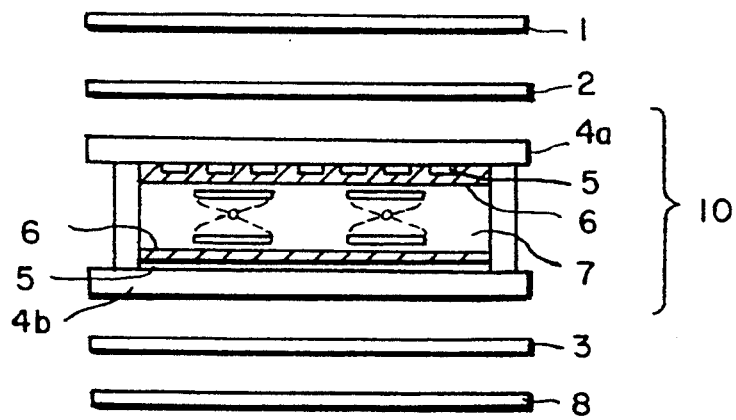
FIG. 3 is a schematic cross-sectional view showing another liquid crystal display according to the invention.

FIGS. 1, 2 and 3 are schematic cross-sectional views each showing a liquid crystal display according to the invention. A liquid crystal panel 10 is constituted by a pair of light transmission substrates 4a and 4b, nematic liquid crystal (STN liquid crystal layer) 7 which is filled between the substrates 4a and 4b to which a chiral dopant is added, a pair of transparent electrodes 5 formed on the faces of the substrates 4a and 4b which face the STN liquid crystal layer 7, respectively, and a pair of orientation films 6. On the front side of the liquid crystal panel 10 (i.e., on the upper side in FIGS. 1, 2 and 3), a front-side polarizing plate 1 is provided, and on the back side of the liquid crystal panel 10 (i.e., on the lower side in FIGS. 1, 2 and 3), a back-side polarizing plate 8 is provided. In addition, a phase plate 2 of a polymeric film which is uniaxially extended is provided on the front side or the back side of the liquid crystal panel 10. Also, an optically anisotropic plate 3 having a twisted structure is provided on the front side or the back side of the liquid crystal panel 10.

FIG. 1 shows a construction in which the phase plate 2 and the optically anisotropic plate 3 are both provided on the front side of the liquid crystal panel 10. FIG. 2 shows a construction in which the optically anisotropic plate 3 is provided on the front side and the phase plate 2 is provided on the back side of the liquid crystal panel 10. FIG. 3 shows a reversed construction to that shown in FIG. 2, in which the phase plate is provided on the front side and the optically anisotropic plate 3 is provided on the back side of the liquid crystal panel 10. In the liquid crystal display having a construction as shown in FIG. 1, both the phase plate 2 and the optically anisotropic plate 3 may be provided on the back side of the liquid crystal panel 10. In the construction shown in FIG. 1, the phase plate 2 may alternatively be provided closer to the liquid crystal panel 10 and the optically anisotropic plate 3 may be provided closer to the front-side polarizing plate 1.

Figure 4:
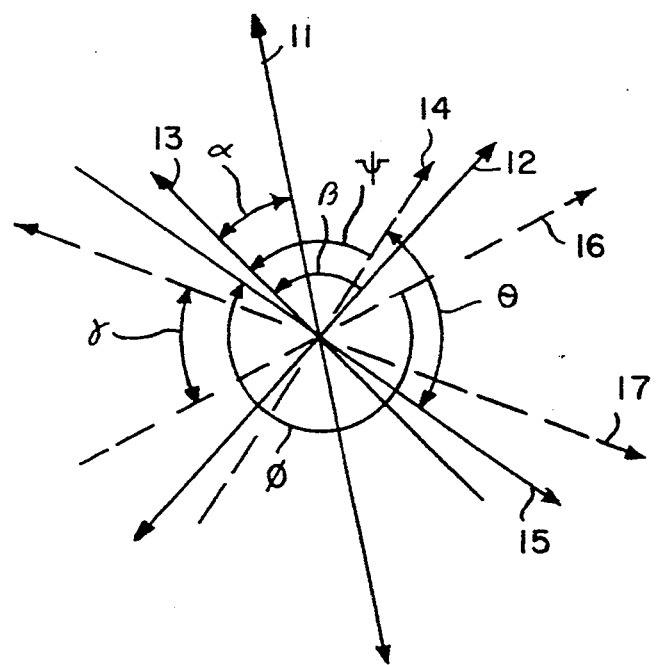
FIG. 4 is a diagram showing a relationship of axes of various components in the liquid crystal display shown in FIG. 1.
Figure 5:
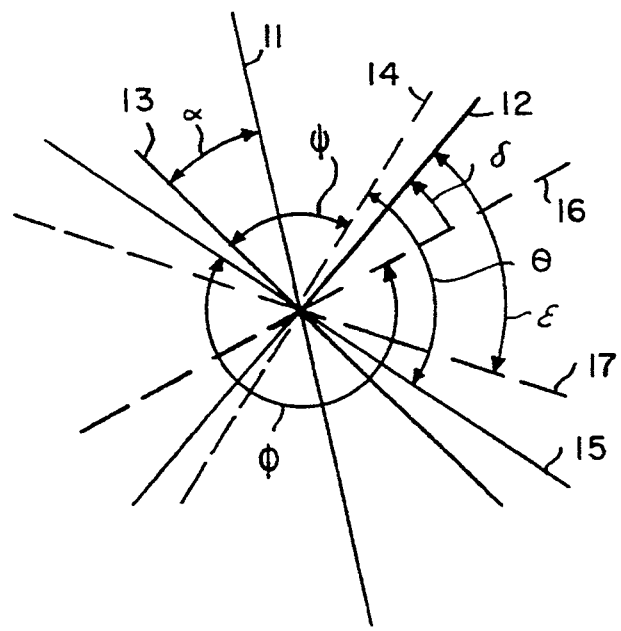
FIG. 5 is a diagram showing a relationship of axes of various components in the liquid crystal displays shown in FIGS. 2 and 3.
Figure 6:
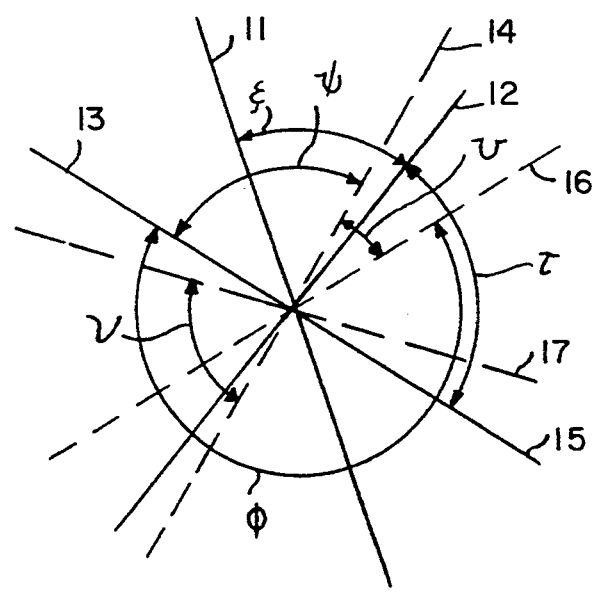
FIG. 6 is a diagram showing a relationship of axes of various components in the liquid crystal display shown in FIG. 3.

FIG. 4 shows relationships such as optical axes of various components and orientation directions of STN liquid crystal molecules in the liquid crystal display shown in FIG. 1. FIGS. 5 and 6 show relationships such as optical axes of various components and orientation directions of STN liquid crystal molecules in the liquid crystal displays as shown in FIGS. 2 and 3.

In FIG. 4, an angle formed by the orientation direction 15 of liquid crystal molecules in the emitting-side substrate 4a of the liquid crystal panel 10 and the orientation direction 16 of liquid crystal molecules in the incident-side substrate 4b of the liquid crystal panel 10 is represented by $\phi$, that is, $\phi$ is a twist angle of the liquid crystal panel 10. An angle formed by an emitting-side optical axis 13 (S-axis) of the optically anisotropic plate 3 and an incident-side optical axis 14 of the optically anisotropic plate 3 is represented by $\psi$, that is, $\psi$ is a twist angle of the optically anisotropic plate 3. A cross angle formed by the incident-side optical axis 14 of the optically anisotropic plate 3 and the orientation direction 15 of liquid crystal molecules in the emitting-side substrate 4a is represented by $\theta$. A cross angle formed by an absorption axis direction 11 of the front-side polarizing plate 1 and the emitting-side optical axis 13 of the optically anisotropic plate 3 is represented by $\alpha$. A cross angle formed by an optical axis (S-axis) 12 of the phase plate 2 and the emitting-side optical axis 13 of the optically anisotropic plate 3 is represented by $\beta$. A cross angle formed by the orientation direction 16 of liquid crystal molecules in the incident-side substrate 4b and an absorption axis direction 17 of the back-side polarizing plate 8 is represented by $\gamma$.

In FIGS. 5 and 6, like angles and axes are indicated by like reference symbols to those in FIG. 4, and the descriptions thereof are omitted. A cross angle formed by the orientation direction 16 of liquid crystal molecules in the incident-side substrate 4b and the optical axis 12 of the phase plate 2 is represented by $\delta$. A cross angle formed by the optical axis 12 of the phase plate 2 and the absorption axis direction 17 of the back-side polarizing plate 8 is represented by $\epsilon$. A cross angle formed by the optical axis 12 of the phase plate 2 and the orientation direction 15 of liquid crystal molecules in the emitting-side substrate 4a is represented by $\tau$. A cross angle formed by the absorption axis direction 11 of the front-side polarizing plate 1 and the optical axis 12 of the phase plate 2 is represented by $\xi$. A cross axis formed by the orientation direction 16 of liquid crystal molecules in the incident-side substrate 4b and the incident-side optical axis 14 of the optically anisotropic plate 3 is represented by $\upsilon$. A cross angle of the incident-side optical axis 14 of the optically anisotropic plate 3 and the absorption axis direction 17 of the back-side polarizing plate 8 is represented by $\gamma$.

In the liquid crystal display having the above construction, by optimizing the respective retardation values and the respective axial angle arrangements of the optically anisotropic plate and the phase plate, a better black/white display can be realized and the contrast ratio can be improved.

Figure 7:
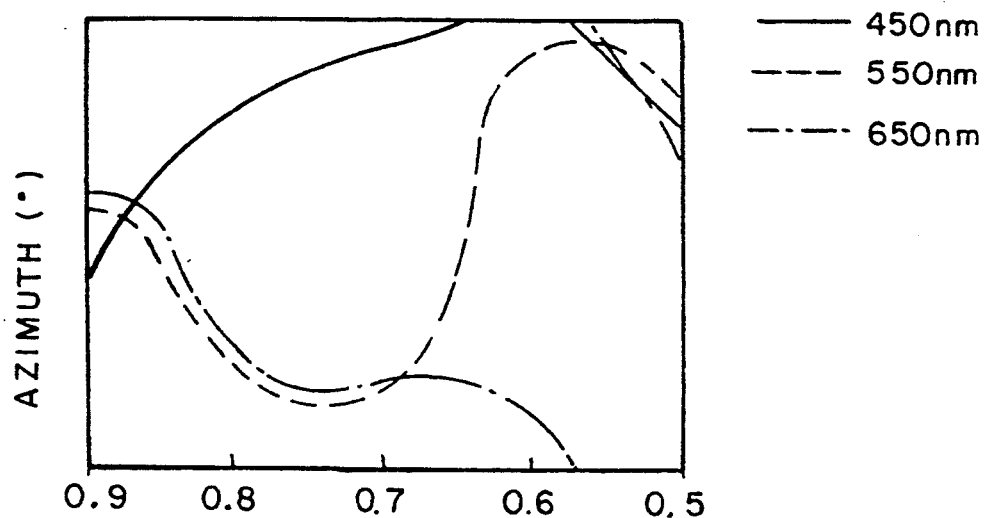
FIG. 7 shows an aximuth of the emission elliptically polarized light immediately before entering a front-side phase plate when an OFF voltage is applied, in the liquid crystal display shown in FIG. 3.

Now, assume the case where, for example, in the liquid crystal display having a construction shown in FIG. 3, the STN liquid crystal layer 7 is levorotatory and has a retardation of 840 nm, and the phase plate 2 is a polymeric film which is uniaxially extended and has a retardation of 565 nm. At this time, the light immediately before entering the front-side polarizing plate 1 is elliptically polarized light. FIG. 7 shows azimuths of emission elliptically polarized light beams which have wavelengths of, for example, λ=450 nm (blue), λ=550 nm (green) and λ=650 nm (red) immediately before entering the front-side polarizing plate 1. It is apparent from this figure that a better black display can be obtained by using the optically anisotropic plate 3 which has a retardation of 500 nm and a twist angle of 90°, and by adjusting an absorbing axis angle of the front-side polarizing plate 1 so that the azimuths of the emission elliptically polarized light of various wavelengths are equal to each other.

EXAMPLE 1

In this example, the optically anisotropic plate 3 shown in FIG. 1 is levorotatory and has a retardation of 900 nm, the phase plate 2 is a polycarbonate film which is uniaxially extended and has a retardation of 450 nm, and the STN liquid crystal layer 7 is levorotatory and has a retardation of 900 nm. The above various angles are set as follows: φ=240°, ψ=90°, θ=0=, β=π°, and γ=40°.

Figure 8:
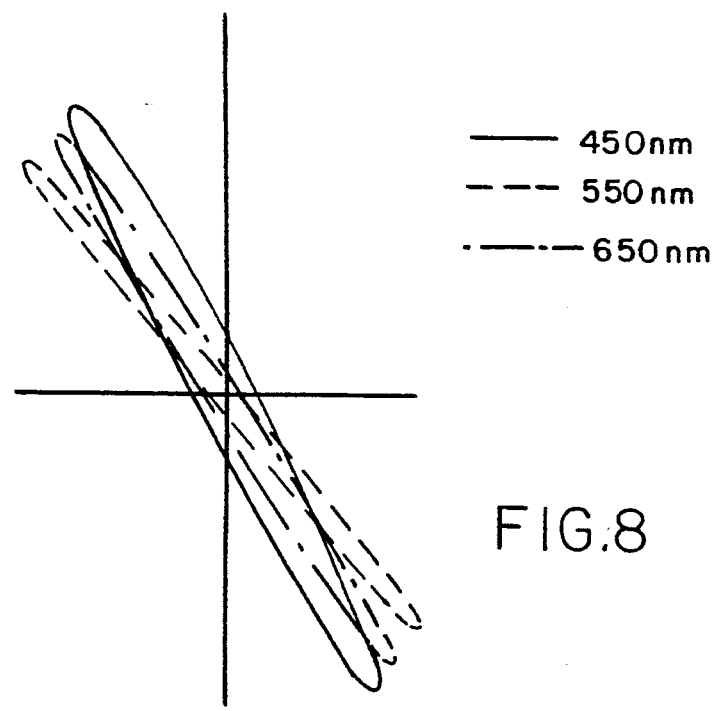
FIG. 8 is a diagram showing the polarized condition of elliptically polarized light having wavelengths of λ=450 nm, λ=550 nm, and λ=650 nm immediately before entering the front-side polarizing plate, in the liquid crystal display of a first example.
Figure 17A:
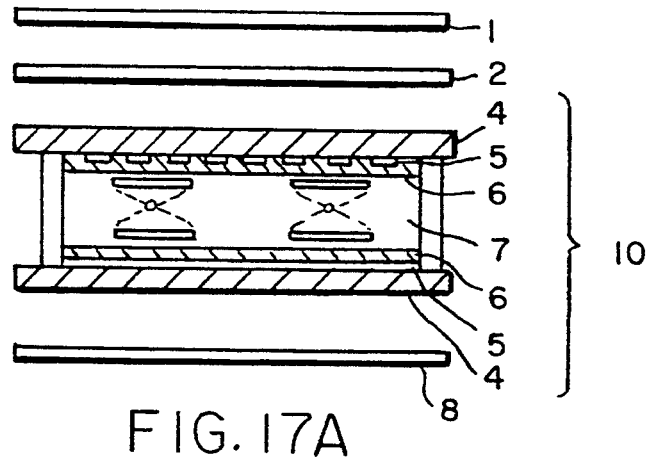
FIGS. 17A and 17B are schematic cross-sectional views showing conventional liquid crystal displays.
Figure 17B:
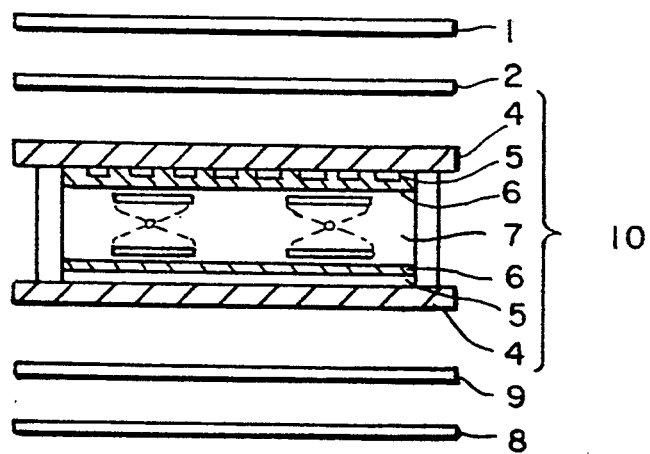
Figure 18:
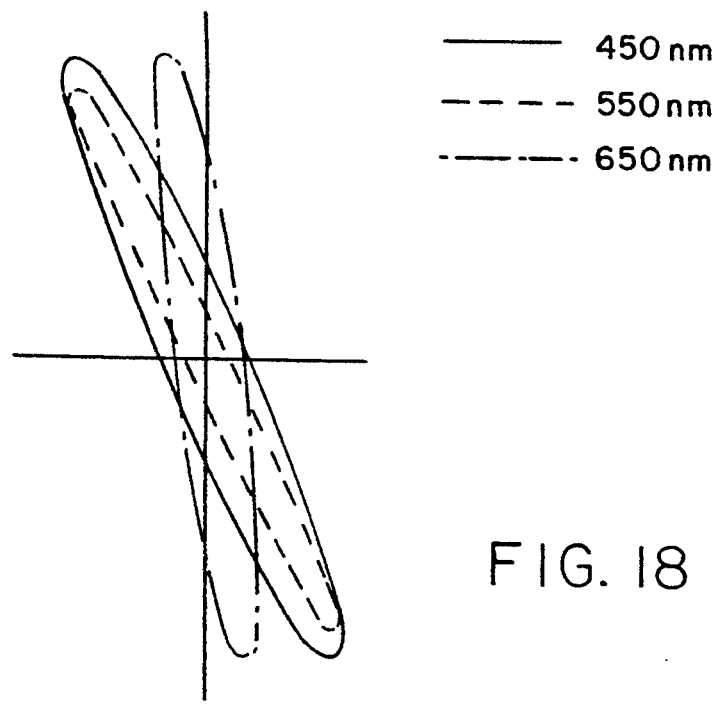
FIG. 18 is a diagram showing the polarized condition of elliptically polarized light having wavelengths of $\lambda=450$ nm, $\lambda=550$ nm, and $\lambda=650$ nm immediately before entering the front-side polarizing plate, in the conventional liquid crystal display shown in FIG. 17B.

As to the liquid crystal display in this example, FIG. 8 shows emission elliptically polarized light beams which have wavelengths of, for example, of λ=450 nm (blue), λ=550 nm (green), and λ=650 nm (red) immediately before entering the front-side polarizing plate 1. As a comparative example, FIG. 18 shows emission elliptically polarized light beams having the above wavelengths of light immediately before entering the front-side polarizing plate, in the case where, for example, in the conventional STN-LCD having a construction shown in FIG. 17B, the front-side phase plate 2 and the back-side phase plate 9 are polycarbonate films which are uniaxially extended and have a retardation of 430 nm, and the STN liquid crystal layer 7 has a retardation of 900 nm. It is seen from FIGS. 8 and 18 that the liquid crystal display of this example has better ellipticity and aximuth as compared with the conventional STN-LCD.

As to the liquid crystal display of this example, the luminance (Y) and the CIE chromaticity coordinates (x, y) are measured when the absorption axis direction 11 of the front-side polarizing plate 1 is actually adjusted to the azimuth of the emission elliptically polarized light immediately before entering the front-side polarizing plate. As a result, the luminance (Y) is measured as 0.425, and the chromaticity coordinates (x, y) are measured as (0.2669, 0.2857). Thus, a very good black display can be obtained.

Figure 9:
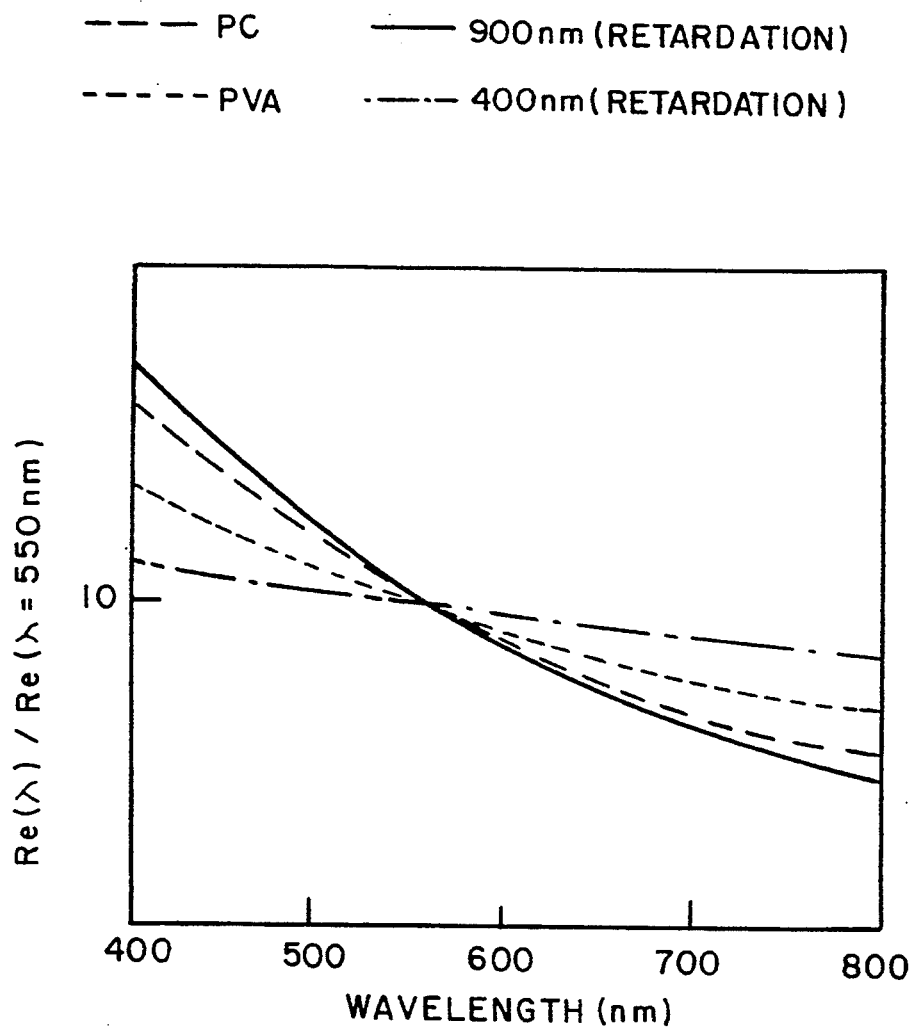
FIG. 9 shows a relationship between a wavelength and a value obtained by standardizing a retardation value of the uniaxially extended polymeric by using the retardation value at λ=550 nm.

Moreover, FIG. 9 shows a relationship between a wavelength and a value obtained by standardizing a retardation value of polycarbonate which is used as a material of the uniaxially extended polymeric by using the retardation value at λ=550 nm. FIG. 9 also shows a relationship between a wavelength and a value obtained by standardizing a retardation value immediately before entering the front-side phase plate 2 by using the retardation value at λ=550 nm. As seen from FIG. 9, the retardation value variation depending on the wavelength in the front-side phase plate 2 is substantially the same as the retardation value variation depending on the wavelength immediately before entering the front-side phase plate 2. Therefore, in the liquid crystal display of this example, the optical compensation can be realized for the wavelengths over the entire visible range.

EXAMPLE 2

In this example, the optically anisotropic plate 3 shown in FIG. 1 is dextrorotatory and has a retardation of 400 nm, the phase plate 2 is a polyvinylalcohol film which is uniaxially extended and has a retardation of 460 nm, and the STN liquid crystal layer 7 is levorotatory and has a retardation of 900 nm. The various angles above are set as follows: φ=240°, ψ=90°, θ=90°, β=90°, and γ=40°.

Figure 10:
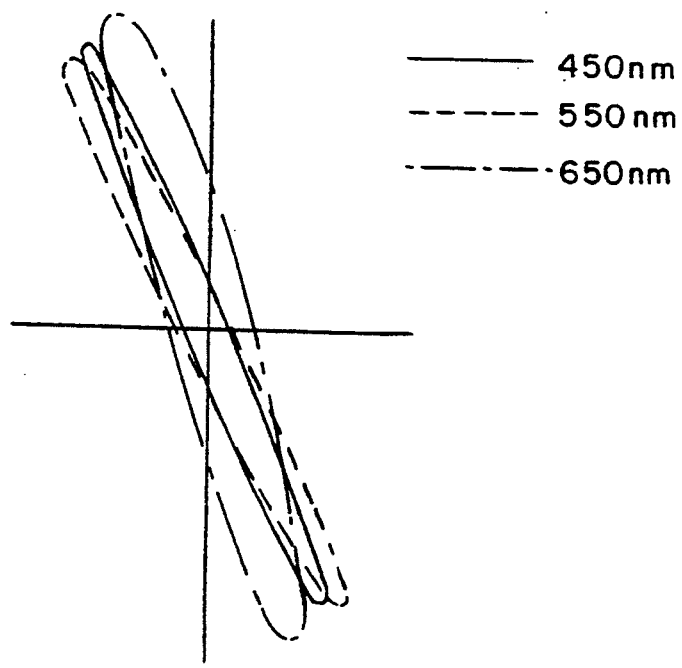
FIG. 10 is a diagram showing the polarized condition of elliptically polarized light having wavelengths of λ=450 nm, λ=550 nm, and λ=650 nm immediately before entering the front-side polarizing plate, in the liquid crystal display of the second example.
Figure 19:
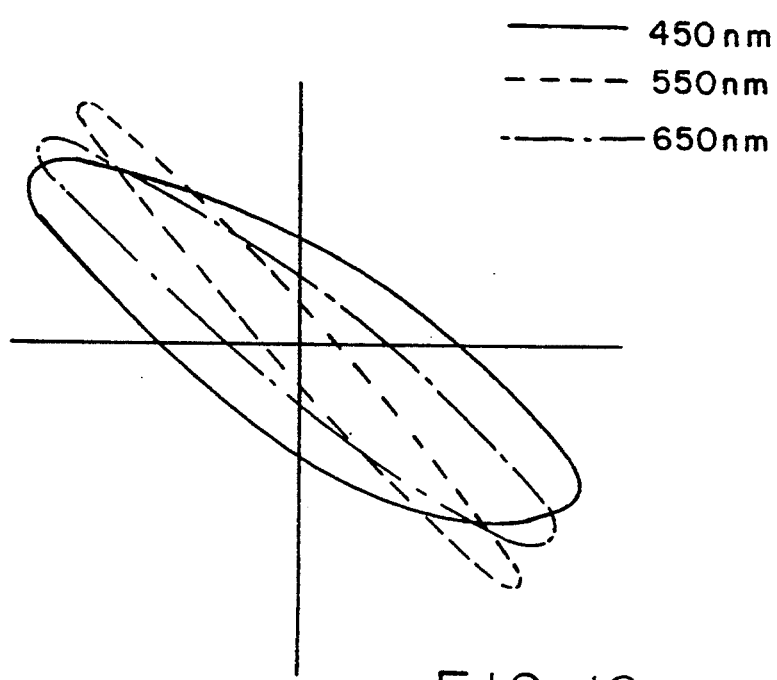
FIG. 19 is a diagram showing the polarized condition of elliptically polarized light having wavelengths of $\lambda=450$ nm, $\lambda=550$ nm, and $\lambda=650$ nm immediately before entering the front-side polarizing plate, in the conventional liquid crystal display shown in FIG. 17B.

As to the liquid crystal display in this example, FIG. 10 shows emission elliptically polarized light beams which have wavelengths of, for example, λ=450 nm (blue), λ=550 nm (green), and λ=650 nm (red) immediately before entering the front-side polarizing plate 1. As a comparative example, FIG. 19 shows emission elliptically polarized light beams having the above wavelengths, in the case where, for example, in the conventional STN-LCD having a construction shown in FIG. 17B, the front-side phase plate 2 and the back-side phase plate 9 are polyvinylalcohol films which are uniaxially extended and have a retardation of 430 nm, and the STN liquid crystal layer 7 has a retardation of 900 nm. It is seen from FIGS. 10 and 19 that the liquid crystal display of this example has better ellipticity and azimuth as compared with the conventional STN-LCD.

As to the liquid crystal display of this example, the luminance (Y) and the CIE chromaticity coordinates (x, y) are measured when the absorption axis direction 11 of the front-side polarizing plate 1 is actually adjusted to the azimuth of the emission elliptically polarized light immediately before entering the front-side polarizing plate. As a result, the luminance (Y) is measured as 1.2439, and the chromaticity coordinates (x, y) are measured as (0.2865, 0.3191). Thus, a very good black display can be obtained. It is noted that, in the complete black display, the luminance Y=0, and the chromaticity coordinates (x, y)=(0.3101, 0.3162) (illuminant C).

Moreover, FIG. 9 shows a relationship between a wavelength and a value obtained by standardizing a retardation value of polyvinylalcohol which is used as a material of the uniaxially extended polymeric by using the retardation value at λ=550 nm. FIG. 9 also shows a relationship between a wavelength and a value obtained by standardizing a retardation value immediately before entering the front-side phase plate 2 by using the retardation value at λ=550 nm. As seen from FIG. 9, the retardation value variation depending on the wavelength in the front-side phase plate 2 is substantially the same as the retardation value variation depending on the wavelength immediately before entering the front-side phase plate 2. Therefore, in the liquid crystal display of this example, the optical compensation can be realized for the wavelengths over the entire visible range.

EXAMPLE 3

In this example, the optically anisotropic plate 3 shown in FIG. 2 is dextrorotatory and has a retardation of 500 nm, the phase plate 2 is a polycarbonate film which is uniaxially extended and has a retardation of 565 nm, and the STN liquid crystal layer 7 is levorotatory and has a retardation of 840 nm. The various angles in FIG. 5 are set as follows: φ=240°, ψ=90°, θ=90°, δ=90°, and ε=30°.

Figure 11:
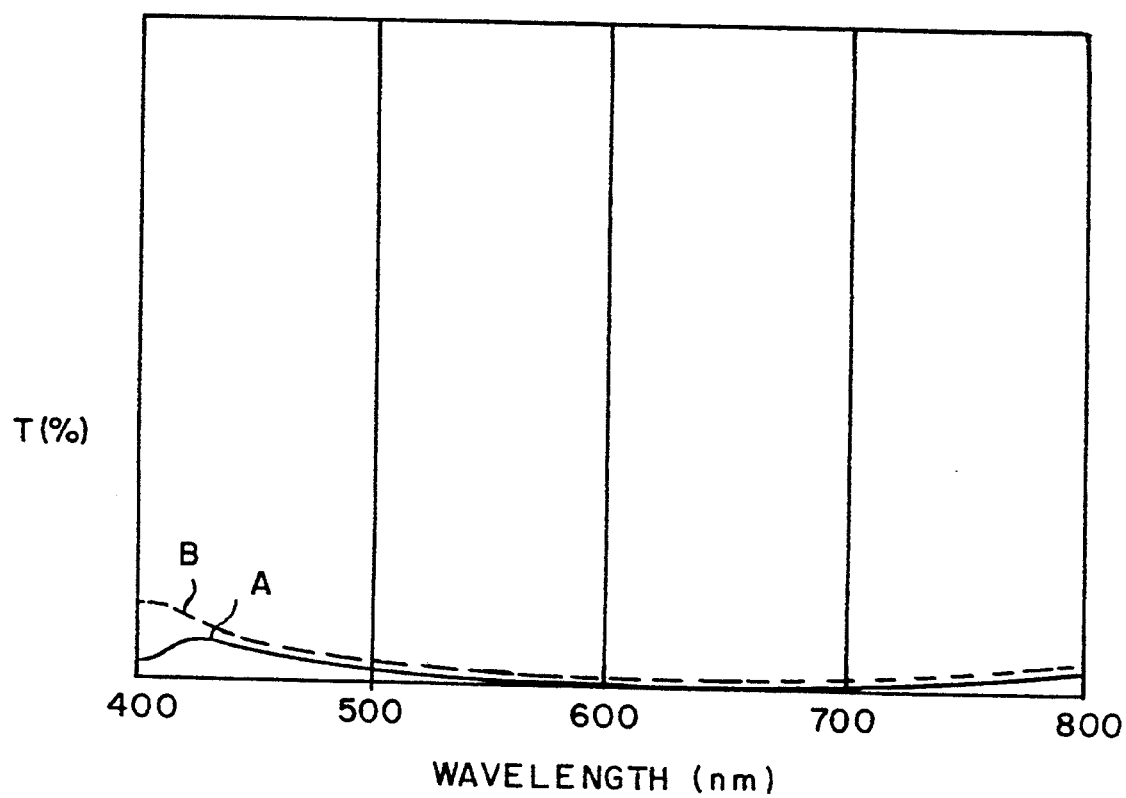
FIG. 11 is a diagram showing spectral transmittance of the resulting emission light when an OFF voltage is applied in the liquid crystal display of a third example and in the conventional liquid crystal display.

As to the liquid crystal display in this example, a relationship between the spectral transmittance and the wavelength when an OFF voltage is applied is indicated by a solid line A in FIG. 11. As a comparative example, a relationship between the spectral transmittance and the wavelength in the case where, for example, in the conventional STN-LCD having a construction shown in FIG. 17B, the front-side phase plate 2 and the back-side phase plate 9 are polycarbonate films which are uniaxially extended and have a retardation of 430 nm, and the STN liquid crystal layer 7 has a retardation of 900 nm is indicated by a broken line B in FIG. 11. It is seen from FIG. 11 that in the liquid crystal display of this example, the transmittance of wavelengths over the entire visible range is lower as compared with the conventional STN-LCD, so that a very good display can be obtained. In this example, the luminance (Y) and the CIE chromaticity coordinates (x, y) are measured as Y=1.7170, and (x, y)=(0.2755, 0.2266). Thus, a very good black display with low luminance can be obtained.

EXAMPLE 4

In this example, the optically anisotropic plate 3 shown in FIG. 3 is dextrorotatory and has a retardation of 700 nm, the phase plate 2 is a polycarbonate film which is uniaxially extended and has a retardation of 430 nm, and the STN liquid crystal layer 7 is levorotatory and has a retardation of 815 nm. The various angles in FIG. 5 are set as follows: $\phi=240°$, $\psi=90°$, $\theta=90°$, $\delta=90°$, and $\epsilon=30°$.

Figure 12:
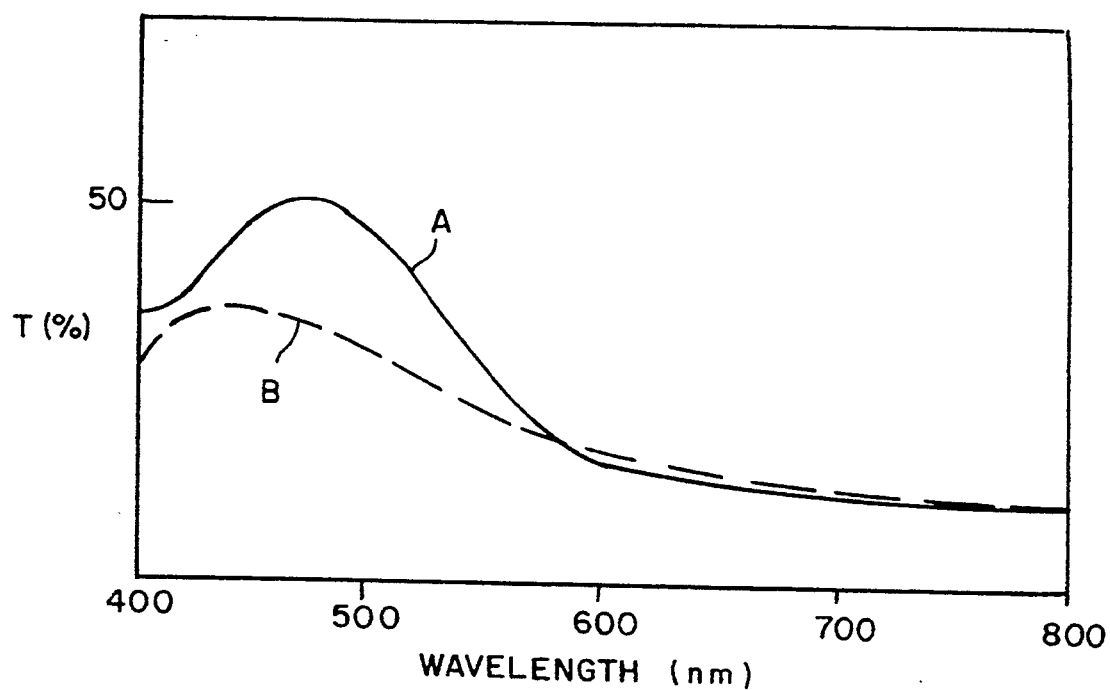
FIG. 12 is a diagram showing spectral transmittance of the resulting emission light when an ON voltage is applied in the liquid crystal display of a fourth example and in the conventional liquid crystal display.

As to the liquid crystal display in this example, a relationship between the spectral transmittance and the wavelength when an ON voltage is applied is indicated by a solid line A in FIG. 12. As a comparative example, a relationship between the spectral transmittance and the wavelength in the case where, for example, in the conventional STN-LCD having a construction shown in FIG. 17B, the front-side phase plate 2 and the back-side phase plate 9 are polycarbonate films which are uniaxially extended and have a retardation of 430 nm, and the STN liquid crystal layer 7 has a retardation of 900 nm is indicated by a broken line B in FIG. 12. It is seen from FIG. 12 that in the liquid crystal display of this example, the transmittance of wavelengths from 400 to 600 nm is higher than that in the conventional STD-LCD, so that a very good display can be obtained. In this example, the luminance (Y) and the CIE chromaticity coordinates (x, y) are measured as Y=24.9535, and (x, y)=(0.2530, 0.2456). Thus, a very good white display can be obtained.

In the above first to fourth examples, the description is made by using an optically anisotropic plate having 90°-twisted structure. This invention is not limited solely to this. Alternatively, if a structure with a twist angle smaller than 90°, such as 60°, 70°, or 80°, or a structure with a twist angle larger than 90°, such as 130° is used, the same effects can be attained.

EXAMPLE 5

In this example, the optically anisotropic plate 3 shown in FIG. 3 is dextrorotatory and has a retardation of 280 nm, the phase plate 2 is a quarterwave plate of polycarbonate, and the STN liquid crystal layer 7 is levorotatory and has a retardation of 660 nm. The various angles in FIG. 6 are set as follows: $\phi=240°$, $\psi=64°$, $\tau=45°$, $\xi=20°$, $\upsilon=90°$, and $\gamma=10°$.

Figure 13:
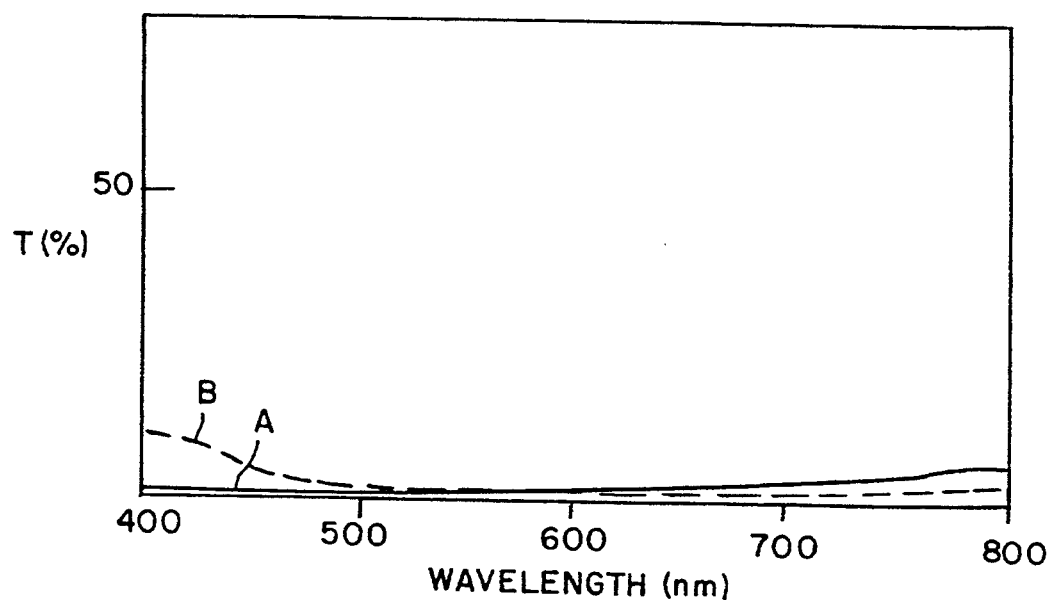
FIG. 13 is a diagram showing spectral transmittance of the resulting emission light when an OFF voltage is applied in the liquid crystal display of a fifth example and in the conventional liquid crystal display.

As to the liquid crystal display in this example, a relationship between the spectral transmittance and the wavelength when an OFF voltage is applied is indicated by a solid line A in FIG. 13. As a comparative example, a relationship between the spectral transmittance and the wavelength in the case where, for example, in the conventional STN-LCD having a construction shown in FIG. 17B, the front-side phase plate 2 and the back-side phase plate 9 are polycarbonate films which are uniaxially extended and have a retardation of 430 nm, and the STD liquid crystal layer 7 has a retardation of 900 nm is indicated by a broken line B in FIG. 13. It is seen from FIG. 13 that in the liquid crystal display of this example, the transmittance of wavelengths in the visible range is lower than that in the conventional STN-LCD, so that a very good display can be obtained. In this example, the luminance (Y) and the CIE chromaticity coordinates (x, y) are measured as Y=0.8052, and (x, y)=(0.3046, 0.2660). Thus, a very good black display with low luminance can be obtained.

EXAMPLE 6

In this example, the optically anisotropic plate 3 shown in FIG. 3 is dextrorotatory and has a retardation of 280 nm, the phase plate 2 is a quarter-wave plate of polycarbonate, and the STN liquid crystal layer 7 is levorotatory and has a retardation of 660 nm. The various angles in FIG. 6 are set as follows: $\phi=240°$, $\psi=84°$, $\tau=45°$, $\xi=90°$, $\upsilon=90°$, and $\gamma=105°$.

Figure 14:
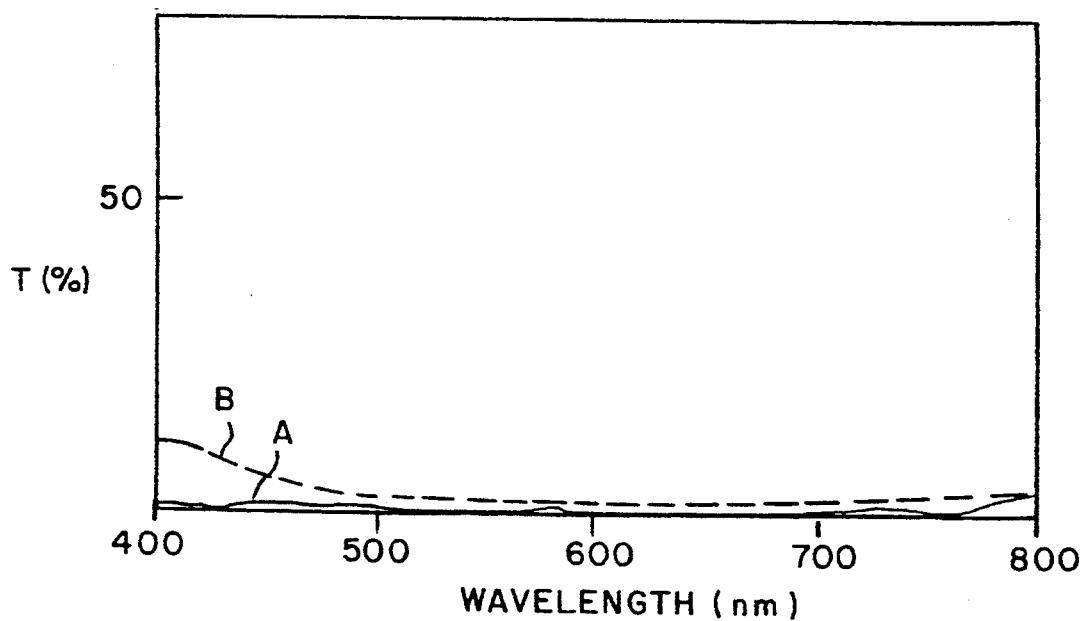
FIG. 14 is a diagram showing spectral transmittance of the resulting emission light when an OFF voltage is applied in the liquid crystal display of a sixth example and in the conventional liquid crystal display.

As to the liquid crystal display in this example, a relationship between the spectral transmittance and the wavelength when an OFF voltage is applied is indicated by a solid line A in FIG. 14. As a comparative example, a relationship between the spectral transmittance and the wavelength in the case where, for example, in the conventional STN-LCD having a construction shown in FIG. 17B, the front-side phase plate 2 and the back-side phase plate 9 are polycarbonate films which are uniaxially extended and have a retardation of 430 nm, and the STN liquid crystal layer 7 has a retardation of 900 nm is indicated by a broken line B in FIG. 14. It is seen from FIG. 14 that in the liquid crystal display of this example, the transmittance of wavelengths in the visible range is lower than that in the conventional STN-LCD, so that a very good display can be obtained. In this example, the luminance (Y) and the CIE chromaticity coordinates (x, y) are measured as Y=0.6648, and (x, y)=(0.2539, 0.2950). Thus, a very good black display with low luminance can be obtained.

EXAMPLE 7

In this example, the optically anisotropic plate 3 shown in FIG. 3 is dextrorotatory and has a retardation of 280 nm, the phase plate 2 is a quarter-wave plate of polycarbonate, and the STN liquid crystal layer 7 is levorotatory and has a retardation of 660 nm. The various angles in FIG. 6 are set as follows: $\phi=240°$, $\psi=124°$, $\tau=45°$, $\xi=140°$, $\upsilon=90°$, and $\gamma=170°$.

Figure 15:
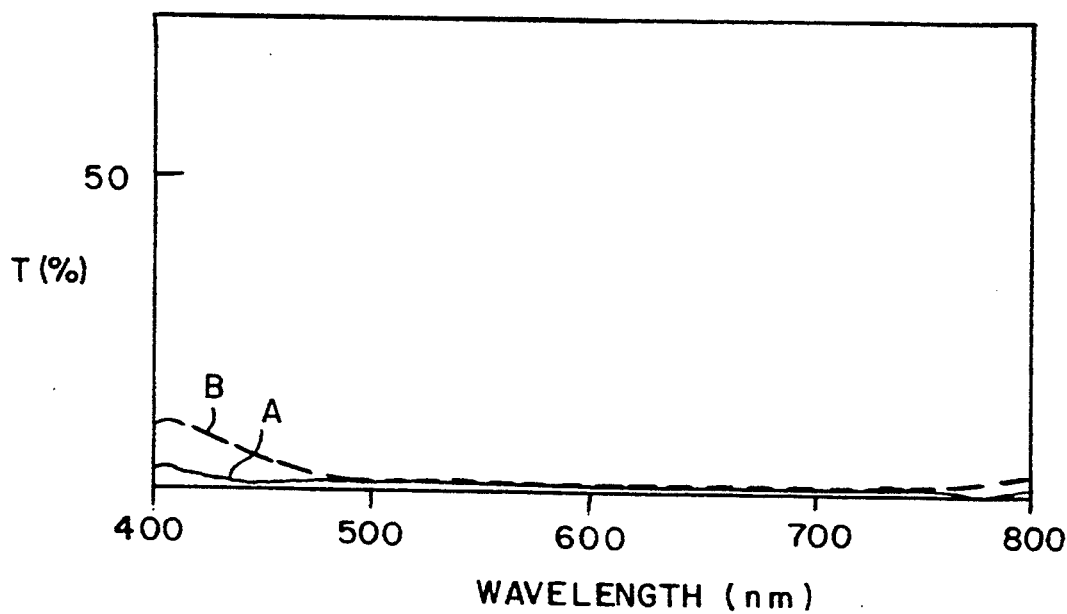
FIG. 15 is a diagram showing spectral transmittance of the resulting emission light when an OFF voltage is applied in the liquid crystal display of a seventh example and in the conventional liquid crystal display.

As to the liquid crystal display in this example, a relationship between the spectral transmittance and the wavelength when an OFF voltage is applied is indicated by a solid line A in FIG. 15. As a comparative example, a relationship between the spectral transmittance and the wavelength in the case where, for example, in the conventional STN-LCD having a construction shown in FIG. 17B, the front-side phase plate 2 and the back-side phase plate 9 are polycarbonate films which are uniaxially extended and have a retardation of 430 nm, and the STN liquid crystal layer 7 has a retardation of 900 nm is indicated by a broken line B in FIG. 15. It is seen from FIG. 15 that in the liquid crystal display of this example, the transmittance of wavelengths in the visible range is lower than that in the conventional STN-LCD, so that a very good display can be obtained. In this example, the luminance (Y) and the CIE chromaticity coordinates (x, y) are measured as Y=0.6770, and (x, y)=(0.3274, 0.2929). Thus, a very good black display with low luminance can be obtained.

EXAMPLE 8

In this example, the optically anisotropic plate 3 shown in FIG. 3 is dextrorotatory and has a retardation of 280 nm, the phase plate 2 is a quarter-wave plate of polyvinylalcohol, and the STN liquid crystal layer 7 is levorotatory and has a retardation of 660 nm. The various angles in FIG. 6 are set as follows: $\phi=240°$, $\psi=84°$, $\tau=45°$, $\xi=20°$, $\upsilon=90°$, and $\gamma=15°$.

Figure 16:
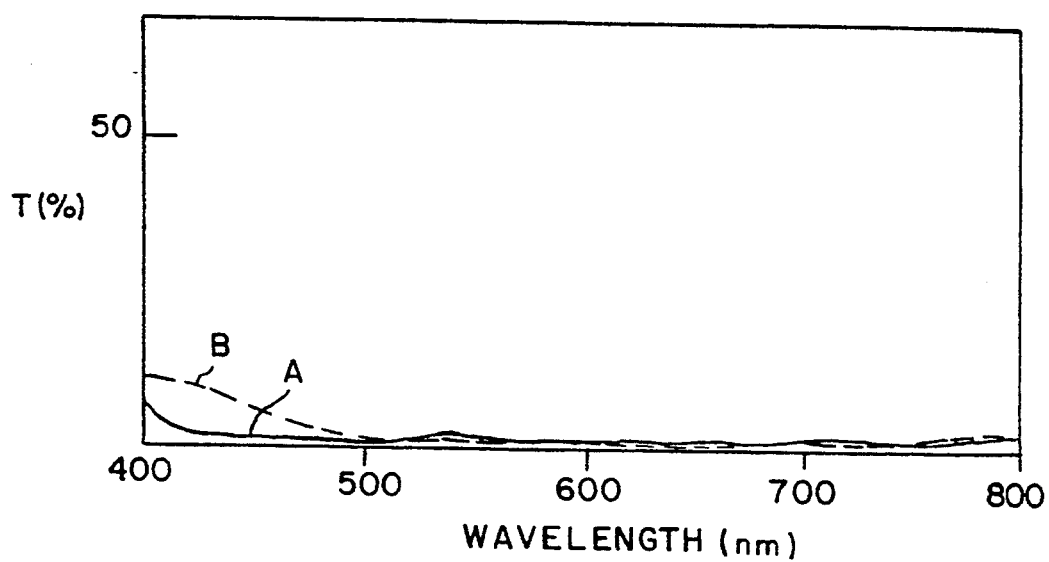
FIG. 16 is a diagram showing spectral transmittance of the resulting emission light when an OFF voltage is applied in the liquid crystal display of an eighth example and in the conventional liquid crystal display.

As to the liquid crystal display in this example, a relationship between the spectral transmittance and the wavelength when an OFF voltage is applied is indicated by a solid line A in FIG. 16. As a comparative example, a relationship between the spectral transmittance and the wavelength in the case where, for example, in the conventional STN-LCD having a construction shown in FIG. 17B, the front-side phase plate 2 and the back-side phase plate 9 are polycarbonate films which are uniaxially extended and have a retardation of 430 nm, and the STN liquid crystal layer 7 has a retardation of 900 nm is indicated by a broken line B in FIG. 16. It is seen from FIG. 16 that in the liquid crystal display of this example, the transmittance of wavelengths in the visible range is lower than that in the conventional STN-LCD, so that a very good display can be obtained. In this example, the luminance (Y) and the CIE chromaticity coordinates (x, y) are measured as Y=0.8678, and (x, y)=(0.2965, 0.2899). Thus, a very good black display with low luminance can be obtained.

As understood by the above description, the optically anisotropic plate having the above-mentioned twisted structure has a different function from a liquid crystal polymeric film which is intended to be substituted for a cell for optical compensation in the conventional DSTN-LCD. More specifically, when the optically anisotropic plate is used in combination with a phase plate of a uniaxially extended polymeric film, the rotatory polarization which is caused by the pass of light through an STN liquid crystal panel is eliminated and the phase difference is compensated. Therefore, by using an optically anisotropic plate having the above-mentioned twisted structure, a very good black/white display can be obtained.

Moreover, the conventional liquid crystal polymeric film is required to have substantially the same but reversed twist angle as that of the STN liquid crystal panel with which the film is combined. On the contrary, in the liquid crystal display according to the invention, the optically anisotropic plate may have a twist angle of about 90°, and based on the characteristics of the combined phase plate, the optically anisotropic plate may be levorotatory, or dextrorotatory. Therefore, a liquid crystal display with superior high-volume production capability and high reliability can be provided.

An optically anisotropic plate having a twisted structure can be produced, for example, by interposing a low molecular nematic liquid crystal to which a chiral dopant is added between light transmission substrates which have been subjected to the orientation process. Alternatively, high molecular liquid crystal in which chiral nematic molecules are applied to side chains of high molecular chains such as acrylate can be formed as a layer on a light transmission substrate the surface of which has been subjected to the orientation process.

As apparent from the above description, according to the invention, an optically anisotropic plate having a twisted structure is used in combination with a phase plate of an uniaxially extended polymeric film, so that the rotatory polarization of light caused by the STN liquid crystal panel is eliminated, and the phase difference with respect to the liquid crystal panel can be compensated. Therefore, an optical compensation is performed for the wavelengths over the entire visible range, and thus a perfect achromatic color display can be attained. Therefore, the liquid crystal display can be compact and light weight as compared with the DSTN-LCD, and a black/white display and the contrast ratio can also be improved.

By using the optically anisotropic plate having a twisted structure, the retardation value variation depending on the wavelength can be controlled. Accordingly, a phase plate which is constituted by various kinds of polymeric films can easily and desirably be used. Therefore, the liquid crystal display of the invention can largely contribute to the improvement in display quality, larger size, high resolution, and color display. In addition, a liquid crystal display with a high-volume production possibility can be provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display comprising:
    a liquid crystal panel including a pair of substrates and super twisted nematic liquid crystal having a twisted structure with a twist angle of 180° or more, said super twisted nematic liquid crystal being contained between said pair of substrates;
    a pair of polarizing plates which sandwich said liquid crystal panel;
    a member of an optically anisotropic substance having a twisted structure with a twist angle of 90° or less, said member being disposed between one of said pair of polarizing plates and said liquid crystal panel, or between the other one of said pair of polarizing plates and said liquid crystal panel; and
    a phase plate of a polymeric film which is uniaxially extended, said phase plate being disposed between one of said pair of polarizing plates and said liquid crystal panel, or between the other one of said pair of polarizing plates and said liquid crystal panel.

2. A liquid crystal display according to claim 1, wherein a twist direction of said super twisted nematic liquid crystal is in reverse to a twist direction of said member.

3. A liquid crystal display according to claim 2, wherein a product d·$\Delta$n is in the range from 180 nm to 700 nm, where d is a thickness of said member and $\Delta$n is the anisotropy of refractive index.

4. A liquid crystal display according to claim 1, wherein a twist direction of said super twisted nematic liquid crystal is the same as a twist direction of said member.

5. A liquid crystal display according to claim 4, wherein a product of d·$\Delta$n is in the range from 500 nm to 1100 nm, where d is a thickness of said optically anisotropic substance and Δn is the anisotropy of refractive index.

6. A liquid crystal display according to claim 1, wherein said phase plate is a film of polycarbonate.

7. A liquid crystal display according to claim 1, wherein said phase plate is a film of polyvinylalcohol.

8. A liquid crystal display according to claim 1, wherein said phase plate is a quarter-wave plate of polycarbonate.

9. A liquid crystal display according to claim 1, wherein said phase plate is a quarter-wave plate of polyvinylalcohol.

10. A liquid crystal display according to claim 1, wherein the member of an optically anisotropic substance and the phase plate of a polymeric film are provided on one side of the liquid crystal panel.

11. A liquid crystal display according to claim 1, wherein the member of an optically anisotropic substance is a liquid crystal polymeric film.

12. A liquid crystal display comprising:
a liquid crystal panel including a pair of substrates and super twisted nematic liquid crystal having a twisted structure with a twist angle of 180° or more, said super twisted nematic liquid crystal being contained between said pair of substrates;
a pair of polarizing plates which sandwich said liquid crystal panel;
a member of an optically anisotropic substance having a twisted structure with a twist angle from 60° to 130°, said member being disposed between one of said pair of polarizing plates and said liquid crystal panel; and
a phase plate of a polymeric film which is uniaxially extended, said phase plate being disposed between the other one of said pair of polarizing plates and said liquid crystal panel.

13. A liquid crystal display according to claim 12, wherein a twist direction of said super twisted nematic liquid crystal is in reverse to a twist direction of said member.

14. A liquid crystal display according to claim 13, wherein a product d·Δn is in the range from 180 nm to 700 nm, where d is a thickness of said member and Δn is the anisotropy of refractive index.

15. A liquid crystal display according to claim 12, wherein a twist direction of said super twisted nematic liquid crystal is the same as a twist direction of said member.

16. A liquid crystal display according to claim 15, wherein a product of d·Δn is in the range from 500 nm to 1100 nm, where d is a thickness of said member and Δn is the anisotropy of refractive index.

17. A liquid crystal display according to claim 12, wherein said phase plate is a film of polycarbonate.

18. A liquid crystal display according to claim 12, wherein said phase plate is a film of polyvinylalcohol.

19. A liquid crystal display according to claim 12, wherein said phase plate is a quarter-wave plate of polycarbonate.

20. A liquid crystal display according to claim 12, wherein said phase plate is a quarter-wave plate of polyvinylalcohol.

* * * * *